United States Patent Office.

JAMES F. THOMPSON, OF ROCKLAND, ASSIGNOR OF ONE-HALF TO CHARLES F. BAKER, OF BOSTON, MASSACHUSETTS.

COLORING OR BURNISHING COMPOSITION.

SPECIFICATION forming part of Letters Patent No. 494,514, dated March 28, 1893.

Application filed January 19, 1893. Serial No. 459,002. (No specimens.)

*To all whom it may concern:*

Be it known that I, JAMES F. THOMPSON, of Rockland, in the county of Plymouth and State of Massachusetts, have invented certain new and useful Improvements in Coloring or Burnishing Compositions, of which the following is a specification.

This invention relates to a composition employed upon surfaces of heels and other parts of boots or shoes to color or dye the same, and adapted to be so acted upon by friction as to produce a polish or luster upon the surface to which it is applied.

This invention has for its object to provide a coloring dye or composition that can be burnished or polished and is adapted to dry quickly upon the surface to which it is applied, to be burnished or polished while in a dry condition, to impart a high gloss without having its color affected by the operation of polishing or burnishing, and to retain its color and gloss or polish without liability of discoloration or fading.

The invention consists in the improved composition which I will now proceed to describe.

I take carnauba wax, and dissolve or cut the same in a suitable aqueous solution, which for twenty pounds of wax may be composed of two pounds of caustic soda and ten gallons of water. This constitutes a composition having a preponderance of alkali and therefore open to the objection of causing the discoloration of the burnished surface by the action of the alkali. To obviate said objection I overcome the preponderance of alkali by adding to the above described composition a suitable alkali neutralizing ingredient or ingredients as hereinafter specified. The alkali-neutralizing ingredients may for some purposes, be nitrate or sulphate of iron or any other acid solution of iron; or sulphuric acid or any other suitable acid. To the composition having the alkali-neutralizing ingredient or ingredients I add a suitable coloring material, which is, by preference, aniline and tannin, but may be a solution of logwood with bichromate of potash or prussiate of potash or their equivalents. I also prefer to add a suitable gum, such as gum arabic. The composition thus formed is adapted to be spread upon the surface of a heel or other part of a boot or shoe, and after it has become dry it may be burnished or polished by friction applied in any suitable way, such as by a power-operated brush.

I have heretofore manufactured a composition for the purpose above described, by dissolving wax in an alkaline solution. I have found, however, by practical experience, that after the composition has been applied and burnished, the burnished surface is liable to be discolored and given a gray tint, this result being due to the action of the alkali.

I find that by using an alkali-neutralizing ingredient as above described, the above mentioned difficulty is entirely obviated. I also find that carnauba wax produces a much better result than any other wax of which I am aware, hence I prefer to employ this wax in the practice of my invention.

For burnishing coarse or hemlock leather, such as is used for heels and soles of heavy boots and shoes, I find a large quantity of acid ingredients preferably, but for finer or oak leather, such as is used for heels of ladies' boots and shoes I prefer to employ no more of the acid ingredients than may be necessary to neutralize the alkali.

The following ingredients and proportions are preferred, the quantities given being suitable for twenty pounds of wax dissolved in an aqueous solution, as above described. For the alkali-neutralized acid compound one and one half pounds of nitrate of iron, two pounds of aniline and four ounces of tannin or tannic acid. For the alkali-neutralized non-acid compound ten ounces of bichromate of potash, one pound of sulphate of iron and two pounds of aniline.

In making the composition, I first dissolve the wax as above stated, and then add the alkali-neutralizing ingredient, employing more acid where an acid compound is required, and less where a non-acid compound is wanted, as hereinbefore indicated, and finally add a suitable quantity of gum, such as gum arabic, the latter being dissolved by other ingredients of the composition.

I claim—

1. The improved burnishing composition, hereinbefore described, comprising an alkaline solution, an alkali-neutralizing ingredient, carnauba wax, and coloring matter, as set forth.

2. The improved burnishing composition hereinbefore described, comprising an alkaline solution, an alkali-neutralizing ingredient, carnauba wax, a suitable gum, and coloring matter, as set forth.

In testimony whereof I have signed my name to this specification, in the presence of two subscribing witnesses, this 16th day of January, A. D. 1893.

JAMES F. THOMPSON.

Witnesses:
A. D. HARRISON,
WALTER S. McLEOD.